United States Patent [19]

Semba

[11] Patent Number: 5,760,991
[45] Date of Patent: Jun. 2, 1998

[54] DISK STORAGE UNIT POSITIONING CONTROL FOR APPLYING DC OFFSETS TO A TRACKING ERROR

[75] Inventor: Tetsuo Semba, Zama, Japan

[73] Assignee: International Business Machines Corporation, Armonk, N.Y.

[21] Appl. No.: 330,945

[22] Filed: Oct. 28, 1994

[30] Foreign Application Priority Data

Feb. 14, 1994 [JP] Japan ................................. 6-017067

[51] Int. Cl.$^6$ ........................... G11B 5/596; G11B 7/00
[52] U.S. Cl. ........................ 360/79.06; 360/77.04; 360/44.11
[58] Field of Search ........................... 360/77.03, 77.04, 360/78.06, 78.07, 78.08; 369/44.11, 44.28, 44.29

[56] References Cited

U.S. PATENT DOCUMENTS

| | | | |
|---|---|---|---|
| 4,796,112 | 1/1989 | Mizukami et al. | 360/78.07 |
| 4,907,109 | 3/1990 | Senio | 360/77.04 X |
| 5,166,842 | 11/1992 | Albert et al. | 360/77.04 |
| 5,168,398 | 12/1992 | Kanda et al. | 360/77.04 |
| 5,255,253 | 10/1993 | Kagami et al. | 369/44.28 |
| 5,351,222 | 9/1994 | Ikeda et al. | 369/44.28 X |

FOREIGN PATENT DOCUMENTS

| | | |
|---|---|---|
| 56-114176 | 9/1981 | Japan . |
| 61-39275 | 2/1986 | Japan . |
| 162240 | 7/1987 | Japan . |
| 63-148427 | 6/1988 | Japan . |
| 1-92973 | 4/1989 | Japan . |
| 038724 | 2/1992 | Japan . |

Primary Examiner—Aristotelis M. Psitos
Assistant Examiner—Regina Y. Neal
Attorney, Agent, or Firm—R. M. Sullivan; D. A. Shifrin

[57] ABSTRACT

A disk storage unit according to the present invention comprises a disk for storing data, a head for at least reading data stored on the disk, a controller for controlling a seek operation in which the head moves from a current track to a target track and a tracking operation in which the head tracks the target track after reaching the target track, based on a tracking error signal, and a device for adding a dc offset to the tracking error signal so that head drive power having a direction opposite that of the seek operation and corresponding to the velocity of the head in the seek operation is generated after the head has reached the target track and the seek operation has been switched to the tracking operation.

2 Claims, 6 Drawing Sheets

DISK STORAGE UNIT POSITIONING CONTROL FOR APPLYING DC OFFSETS TO A TRACKING ERROR

BACKGROUND OF THE INVENTION

1. FIELD OF THE INVENTION

The present invention relates to a disk storage unit such as a hard-disk drive or an optical-disk drive and, more particularly, to a positioning control of the head of the disk storage unit.

2. DESCRIPTION OF THE RELATED ART

The control circuit of a conventional disk storage unit is shown in FIG. 6. When the head of the disk storage unit is moved from a certain track to a target track and data is written or read, the following two sequential controls are needed: (1) Terminals a and c of a switch 1 are connected, and a head actuator 5 is driven by a drive signal 4. The head of the disk storage unit is moved by the head actuator 5, and the head position is detected by a head position sensor 8. The head position sensor 8 gives a difference of location between the track and the head and also generates a tracking error signal 2 having a periodicity every one track. The periodicity of this tracking error signal 2 is counted by a counter 6, the distance between the target track and the head is calculated, and a signal 3 corresponding to that distance is transmitted to a velocity command generator 14. The velocity command generator 14 outputs a velocity command, based on the distance between the target and the head. A velocity detector 12 detects the velocity of the head from the frequency of the tracking error signal 2. The current head velocity and the output of the velocity command generator 14 are compared in a comparator 9. The comparator 9 generates the drive signal 4 for correcting the difference between the current head velocity and the generator output. This is repeated until the head reaches the target track. The control described above is referred to as seek control, and the operation is referred to as a seek operation. (2) Once the head reaches the target track, terminals b and c of the switch 1 are connected and the head is controlled so that it is within one track and tracks the central location of the target track at all times. This control is referred to as tracking control, and this operation is referred to as a tracking operation.

The seek operation preferably ends in the shortest possible time, so the maximum acceleration and deceleration of the actuator are used. In general, the maximum acceleration is used as far as the intermediate point between the current head position and the target track, and the maximum deceleration is used from the intermediate point to the target track. With this control, the head velocity is sufficiently decelerated by the time the head reaches the target track, and the head is pulled over the target track in tracking control. However, if the head velocity is not decelerated sufficiently when the head reaches the target track, the head will converge on other than the target track, or the head will not converge at all and the actuator will be moved up to its movable limit. Therefore, the head velocity as the seek operation is switched to the tracking operation is very important. FIG. 7 shows how the head converges on the target track at different velocities. The axis of ordinates is track location and the axis of abscissas is time. Solid line a in FIG. 7 shows that the head velocity indicated by the solid line a' is sufficiently small and converges on the correct track, while broken line b of FIG. 7 shows that the head velocity indicated by broken line b' is too large and converges on another track 2, not a target track. FIG. 8 shows the relationship between the tracking error signal and time in the same case as FIG. 7.

The allowable range of the head velocity as the seek operation is switched to the tracking operation is determined by the pulling ability of tracking control, and seek control must be performed at a rapid acceleration and deceleration to shorten seek time. Therefore, the head velocity at a target track is difficult to maintain in the allowable range. To reliably put the head velocity in the allowable range, the inclination of the velocity curve of the head is made slower as the head approaches the target track. That is, the head velocity is reduced as the head approaches the target track. The variations in the head velocity are shown in FIG. 9.

In addition, even if dc offsets, gain fluctuations, and distortions caused by disk shape asymmetry are contained in the tracking error signal and fluctuations are contained in the actuator gain, pulling of the head to the target track becomes easier if the head velocity is reduced sufficiently.

In most optical disks, a push-pull method using a split-half detector is used to detect the tracking error signal. In this method, a dc offset occurs easily in the tracking error signal because of the optic-axial offset of an objective lens, and pulling of the head in tracking control tends to fail even at the offset of the tracking error signal.

As described above, in the method in which the inclination of the velocity curve of the head is made slower as the head approaches the target track, it is difficult for the optic-axial offset of the objective lens to occur because oscillation exerted on the lens is reduced, but the seek time becomes late.

In addition, PUPA No. 4-38724 discloses a method wherein the offset of a tracking error signal is detected in the latter half of a seek operation, an offset is added to the tracking error signal, and, after the seek operation, the tracking operation is made stable. However, in the method disclosed in this publication, the inclination of the deceleration curve of the head is made slower as shown in FIG. 9, so seek time is not shortened. In addition, since an offset that is added is in the seek operation, what is added is only for making the offset of the tracking error signal zero.

Further, PUPA No. 62-162240 discloses that the amount of offset occurring immediately after a pulling operation is detected and that offset is made zero by adding an offset to the tracking error signal. However, the allowable range of the head velocity cannot be changed by only making the offset zero.

SUMMARY OF THE INVENTION

Accordingly, an object of the present invention is to stably shorten seek time.

In addition, another object of the present invention is to expand the allowable range of head velocity at which the head can be pulled to a target track.

Still another object of the present invention is to prevent a failure of pulling, which is caused by optic-axial offset of objective lenses in optical disks and by unevennesses of disk groove shapes and gain fluctuations in actuators and sensors in disk storage units.

A further object of the present invention is to provide tracking control capable of stably pulling the head to a target track even if the head reaches the target track at high velocity.

A disk storage unit according to the present invention has a disk for storing data, a head for at least reading data stored on said disk, a controller for performing a seek operation and a tracking operation based on a tracking error signal after the head reaches said target track once. The seek operation is for controlling the head to move to a target track from a current track, and the tracking operation is for controlling the head to follow the target track. The invention further includes a device for accumulating a dc offset onto the tracking error signal after switching from the seek operation to the tracking operation to generate a power for driving the head. The power corresponds to the head speed in the seek operation and is opposed to the direction of the seek operation. With this structure, the allowable range of head velocity when the seek operation is switched to the tracking operation can be expanded.

The above disk storage unit may further include a device for accumulating a second dc offset onto the tracking error signal so that the offset of the tracking error signal itself is removed. With this structure, pulling is stable.

The amount of dc offset and second dc offset may be attenuated as time elapses. With this structure, control can be switched stably.

Also, the velocity of the head in the seek operation on which head drive power is based may be a velocity immediately before the seek operation is switched to the tracking operation.

Further, in some cases, it is preferable that the amount of dc offset added to the tracking error signal be proportional to the velocity of the head.

In accordance with another aspect of the present invention, there is provided a disk storage unit, which has a disk for storing data, a head for at least reading data stored on the disk, and a head drive for performing a seek operation and a tracking operation based on a tracking error signal after the head reaches a target track once. The seek operation is for controlling the head to move to a target track from a current track, and the tracking operation is for controlling the head to follow said target track. This invention also includes a device for generating the drive signal that is nonlinear to a distance between the position of the head and the location of the target so that attenuation of the velocity of the head becomes large after switching from the seek operation to the tracking operation. With this structure, the allowable range of the head velocity when the seek operation is switched to the tracking operation can also be expanded.

In accordance with still another aspect of the present invention, there is provided a head controller which controls a seek operation and a tracking operation in a disk storage unit. This invention has a position sensor for generating a tracking error signal representative of a positional offset between the head and the target track, a detection device for detecting a velocity and a direction of movement of the head in the seek operation, and a generation device connected to the detection device for generating a dc offset corresponding to the detected velocity and the detected direction of movements, a device for accumulating the dc offset generated by the generation device onto the tracking error signal.

Also, the head controller may further have a second detection device for detecting an offset of the tracking error signal itself in the seek operation, a second generation device connected to the second detection device for generating a second dc offset so that the offset of the tracking error signal itself becomes zero, and a device for accumulating the second dc offset generated by the second generation device onto the tracking error signal.

Further, the dc offset and the second dc offset may be attenuated as time elapses and added to the tracking error signal.

The dc offset proportional to the velocity of the head in the seek operation may be added to the tracking error signal.

The foregoing and other objects, features and advantages of the invention will be apparent from the following more particular description of a preferred embodiments of the invention, as illustrated in the accompanying drawings.

An object of the present invention is to stably shorten seek time and to expand the allowable range of head velocity at which the head can be pulled to a target track.

DESCRIPTION OF THE PREFERRED EMBODIMENT

Figure 1:
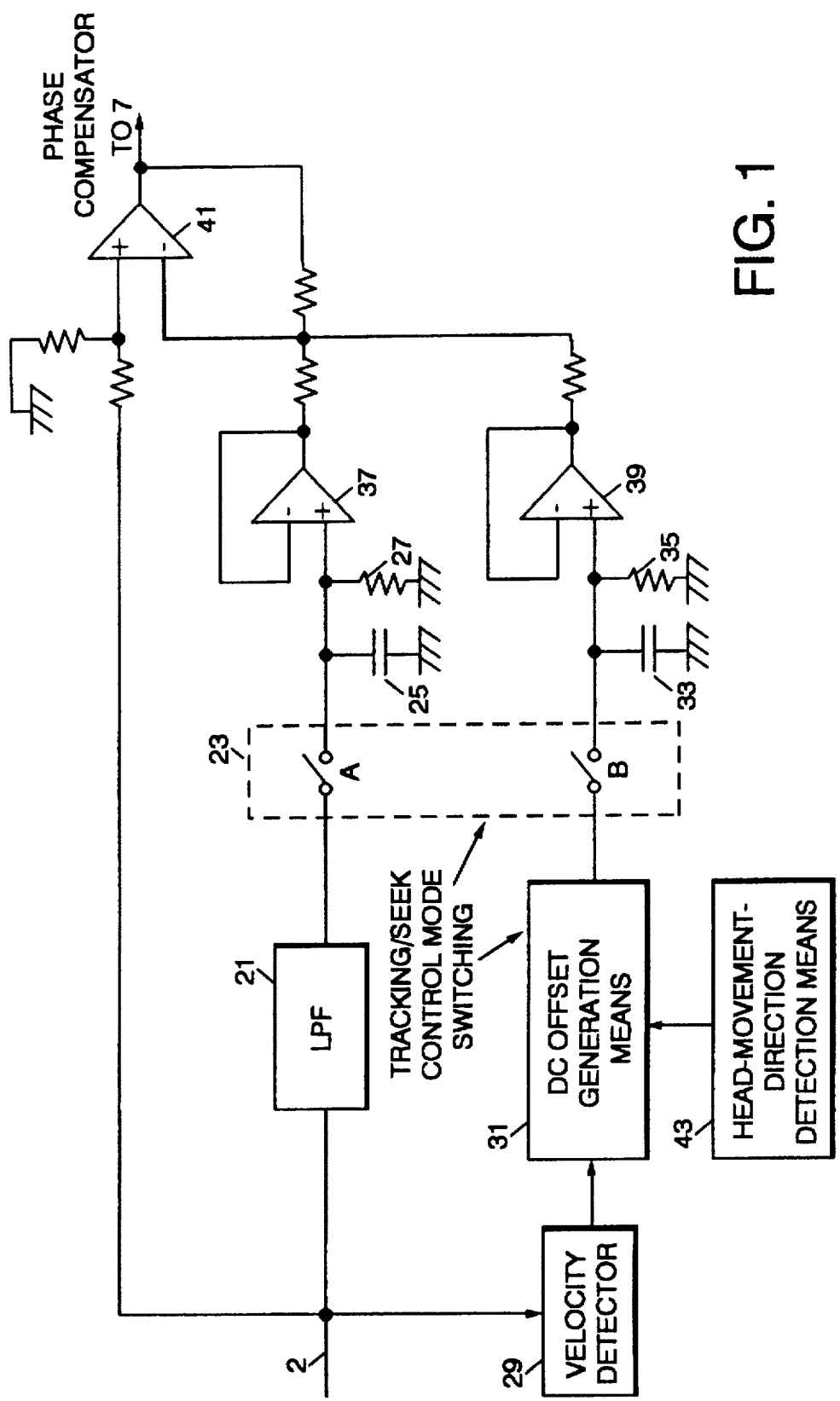
FIG. 1 is a block diagram showing the essential structure of the present invention, the essential structure being inserted into the block 10 in FIG. 2.
Figure 6:
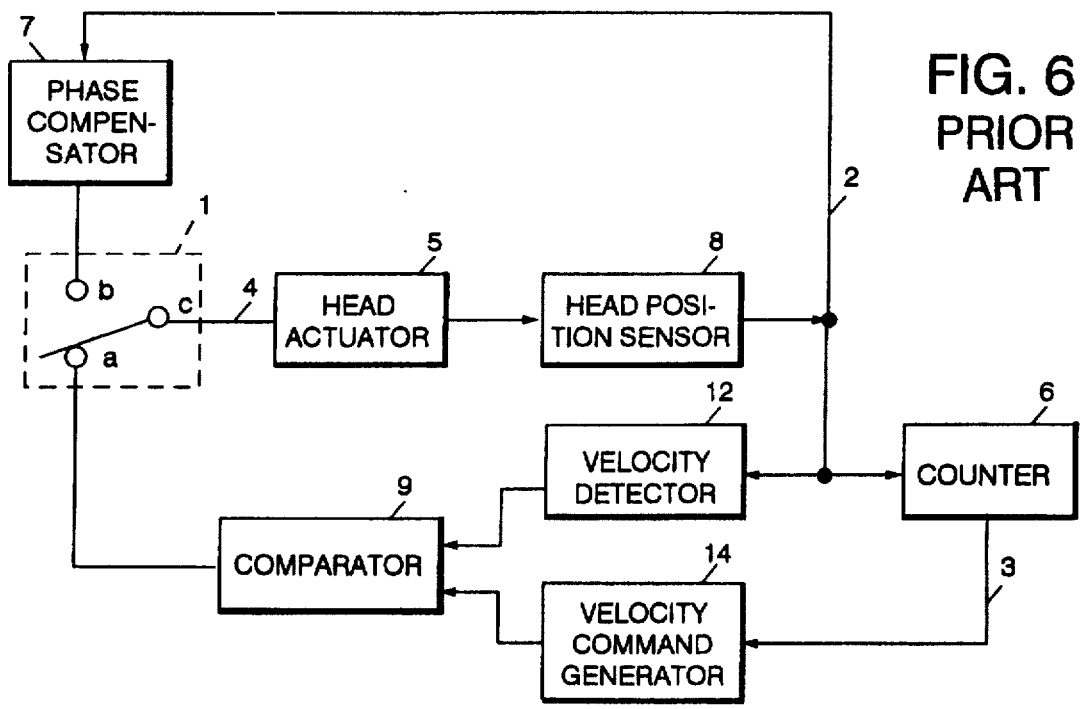
FIG. 6 is a block diagram showing the control circuit of a conventional disk storage disk.

FIG. 1 is a block diagram showing the essential structure of the present invention. This essential structure is inserted into a block 10 of FIG. 2. The block 10 for converting a signal 2 of FIG. 6 is added to FIG. 2. In FIG. 1, a tracking error signal 2 is input to an operational amplifier (adder-subtracter) 41, a low-pass filter (LPF) 21, and a velocity detector 29. The output of the LPF 21 is input to an operational amplifier (adder-subtracter) 37 through a switch 23A. Also, the output of the velocity detector 29 and the output from the head-movement-direction detection means 43 are input to the dc offset generation means 31, which generates a dc offset. The dc offset generated by the dc offset generation means 31 is input to an operational amplifier (adder-subtracter) 39 through a switch 23B. The outputs of the operational amplifiers 37 and 39 are input to the negative input terminal of the operational amplifier 41, and the output of the operational amplifier 41 is input to a phase compensator 7 of FIG. 2.

The operation is hereinafter described. FIG. 1 corresponds to the block 10 in FIG. 2 and operations other than the block 10 are the same as those in FIG. 6, so the influence of the output is not transmitted to the head actuator 5 during a seek operation. However, since a tracking error signal 2 is output at all times, it is also input to the LPF 21 and the velocity detector 29 at all times. The LPF 21 detects the average dc level of the tracking error signal 2 in the seek operation. The switches 23A and 23B are closed during the seek operation, and the average level is held in a capacitor 25. This is for correcting the offset of the tracking error signal itself, which is caused by optic-axial offset of objective lenses in optical disks and by nonuniformity in disk groove shapes and gain fluctuations in actuators and sensors in disk storage units.

Figure 2:
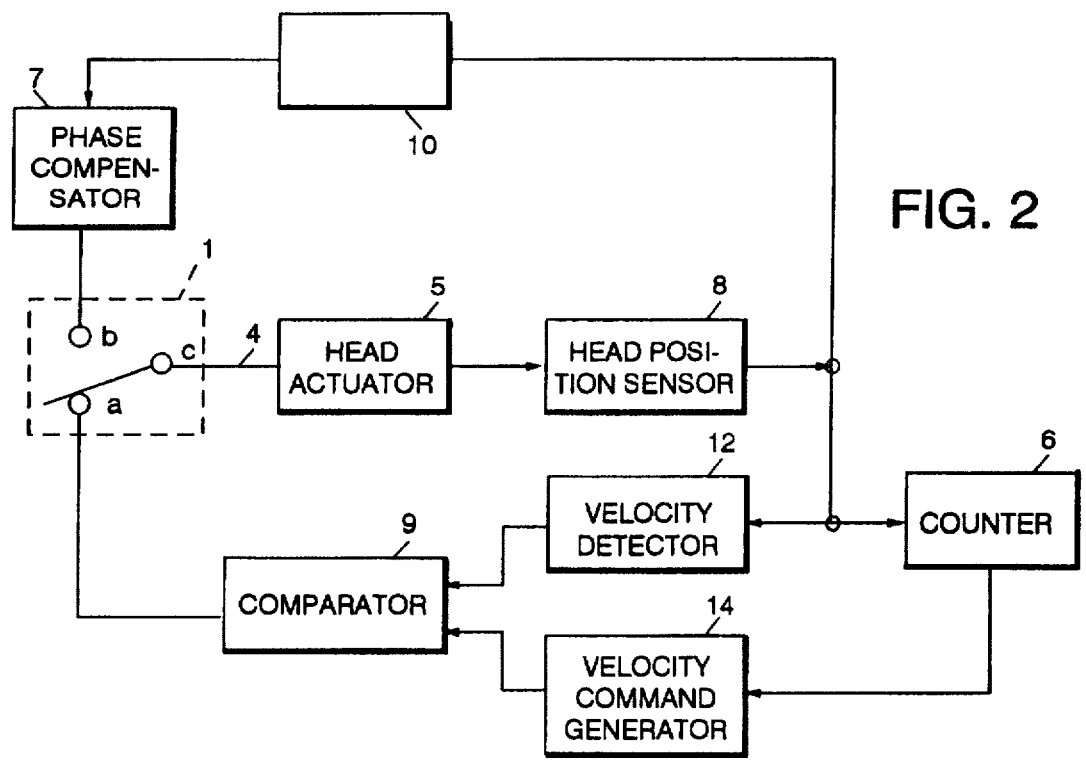
FIG. 2 is a block diagram showing the overall structure of the present invention.

Furthermore, the velocity detector 29 detects a velocity from the frequency of the tracking error signal 2, as in the case of a velocity detector 12 of FIG. 2, and inputs the detected velocity to the dc offset generation means 31. This velocity detector 29 can be omitted and the output of the velocity detector 12 can be connected. The dc offset generation means 31 reads the velocity and outputs a predetermined dc offset corresponding to that velocity. Since this dc offset preferably corresponds to the velocity of the head of the disk storage unit at the time that the head has reached a target track, a dc offset corresponding to the head velocity immediately before the seek operation is switched to the tracking operation (most preferably, a velocity for an interval of one track before the switching) is output, and the capacitor 33 is charged through the closed switch 23B. This dc offset must have a polarity corresponding to the direction of head movement in the seek operation. This is because an offset that reduces the velocity of the head differs depending on the direction of movement. Therefore, a means for detecting the direction in which the head moves (head-movement-direction detection means 43) is needed. In the embodiment of the present invention, it is preferable that a dc offset proportional to the head velocity be added. The present invention, however, is not limited to this condition.

If the head of the disk drive has reached the target track, the mode is switched from the seek operation to the tracking operation. The switches 23A and 23B are open, so a current flows through a resistor 27 via the capacitor 25 and a current flows through a resistor 35 via the capacitor 33. The offsets held in the capacitors 25 and 33 are then input to the operational amplifier 41 through operational amplifiers 37 and 39. Since the tracking error signal 2 is also input to the operational amplifier 41, the tracking signal 2 from which the dc offset from the operational amplifier 37 and the dc offset from the operational amplifier 39 are subtracted is output from the operational amplifier 41. That is, a signal, which is equal to (tracking signal—dc offset from the operational amplifier—dc offset from the operational amplifier), is output from the operational amplifier 41. The output of the operational amplifier 37 is a dc offset of the tracking error signal itself, and the output of the operational amplifier 39 is a dc offset that enhances the pulling ability on the target track.

The output from the block 10 is transmitted to the phase compensator 7 and to the head actuator 5 through terminals b and c of the switch 1.

Electrical charges held in the aforementioned capacitors 25 and 33 are reduced as time elapses and become zero after a certain time. With this, two types of offsets no longer influence the tracking error signal 2 after a certain time, and a normal tracking operation is to be performed. This certain time relates to the time constant, i.e., capacity of a capacitor, so it is necessary to select a capacitor, with an appropriate capacity.

While, in the aforementioned embodiment, the tracking error signal has been corrected by adding an offset to the tracking error signal, it is noted that the velocity of the head can also be largely reduced by a circuit which outputs a drive signal, which is nonlinear to the amplitude of the tracking error signal, to the head actuator, after the head has reached the target track and the seek operation has been switched to the tracking operation.

The aforementioned embodiment is not limited to the circuit shown in FIG. 1. For example, the operational amplifier 41 can be replaced by any type of circuit that can add signals. Capacitors 25 and 33 can also be replaced by a power source and the like controlled to be attenuated with the elapse of time. It is also possible to replace the circuits of FIG. 2 excluding the section corresponding to FIG. 1 with circuits having the same functions.

In addition, for the velocity detector, head-movement-direction detection means, means for switching modes, and the like, they may be circuits controlled by microcomputers or circuits by which signals are generated.

Figure 3:
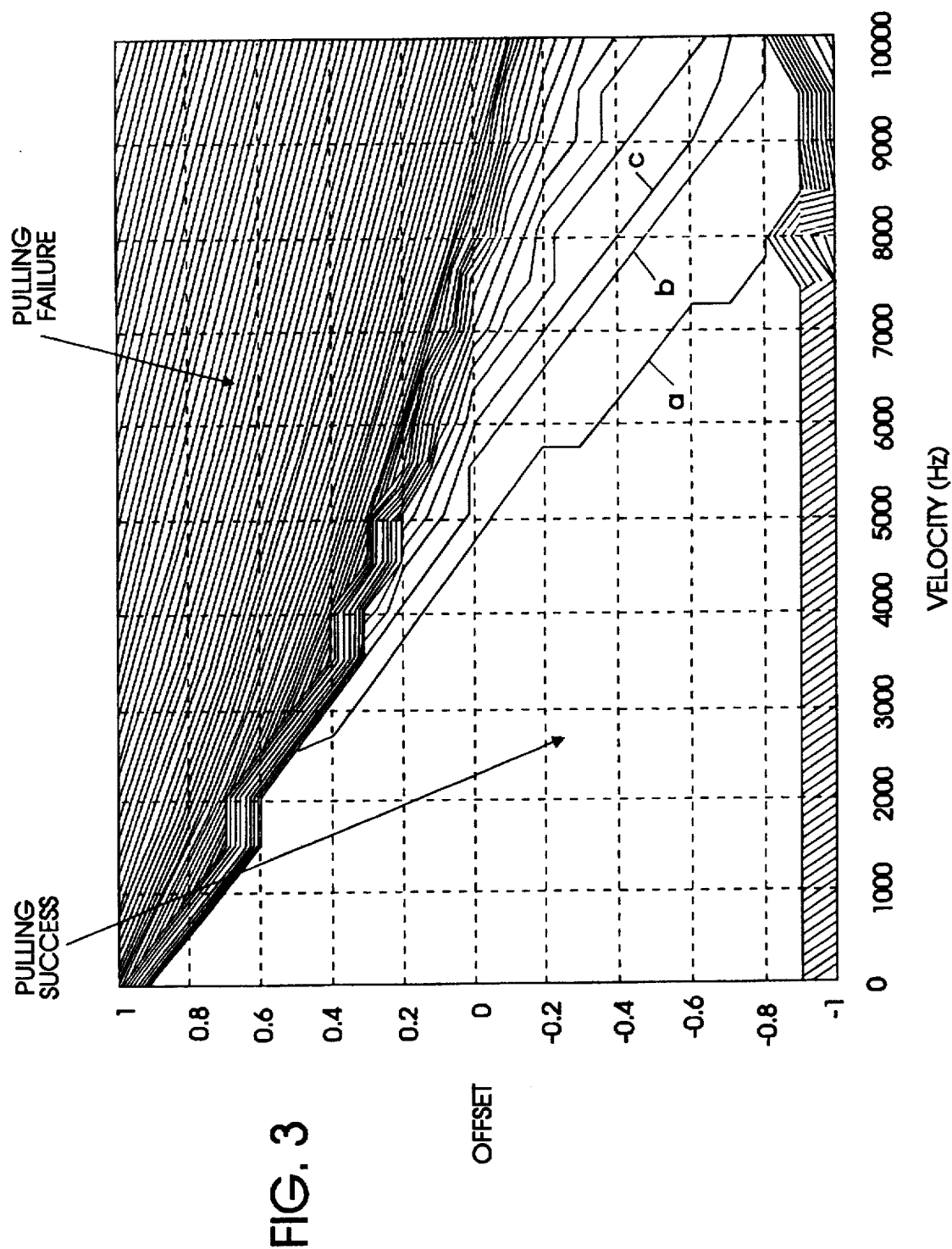
FIG. 3 is a graph showing a range in which pulling of a head succeeds by variations in the relationship between the head velocity and an offset.

FIG. 3 shows the relationship between the amount of offset and pulling velocity. The axis of abscissas represents head velocity immediately before the seek operation is switched to the tracking operation, and the axis of ordinates represents the amount of offset that is added to a tracking error signal. Below and to the left of line a is where pulling to the target track succeeds. The part between lines a and b is where the head converges at a location one track away from the target track. The part between lines b and c is where the head converges at a location two tracks away from the target track. In control without adding an offset as in the conventional disk storage unit, the head cannot be pulled unless the head velocity is less than about 4 kHz (4000 track/s). However, the head can be pulled at a velocity up to about 7 kHz (7000 track/s) by adding an appropriate offset. That is, the offset functions as a bias drive force to the actuator 5 and, in tracking control, the offset reduces the head velocity, which could not be reduced sufficiently in seek control. However, it is necessary to add an offset larger than the amplitude of the tracking error signal because the larger offset may cause the head to converge on another track.

In addition, if the offset quantity is proportional to the velocity of the head and the offset is made smaller when the head velocity is low, pulling of the head will become more independent of variations in the amplitude of the tracking error signal.

Figure 4:
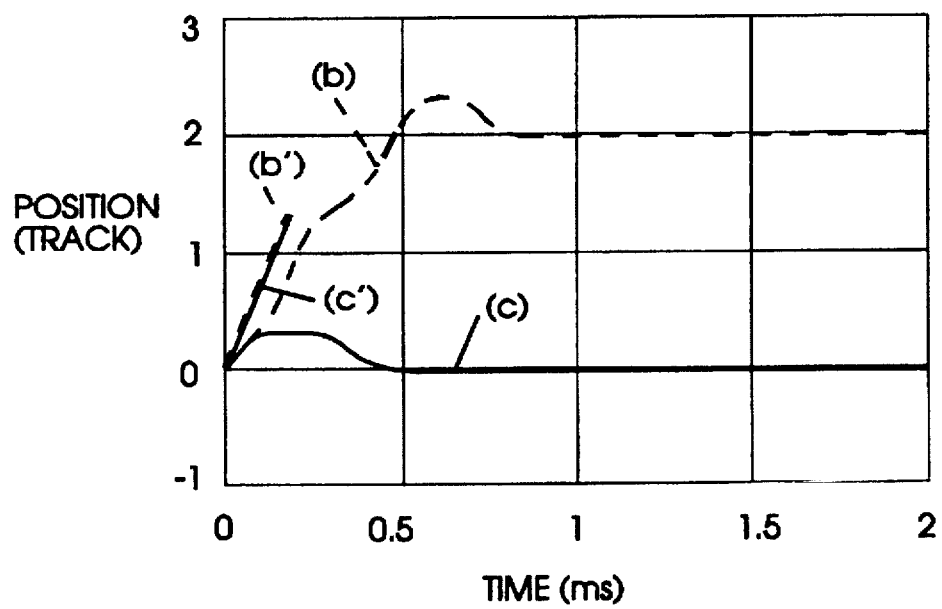
FIG. 4 is a graph showing how the head converges on a target track at different velocities in accordance with the present invention.
Figure 5:
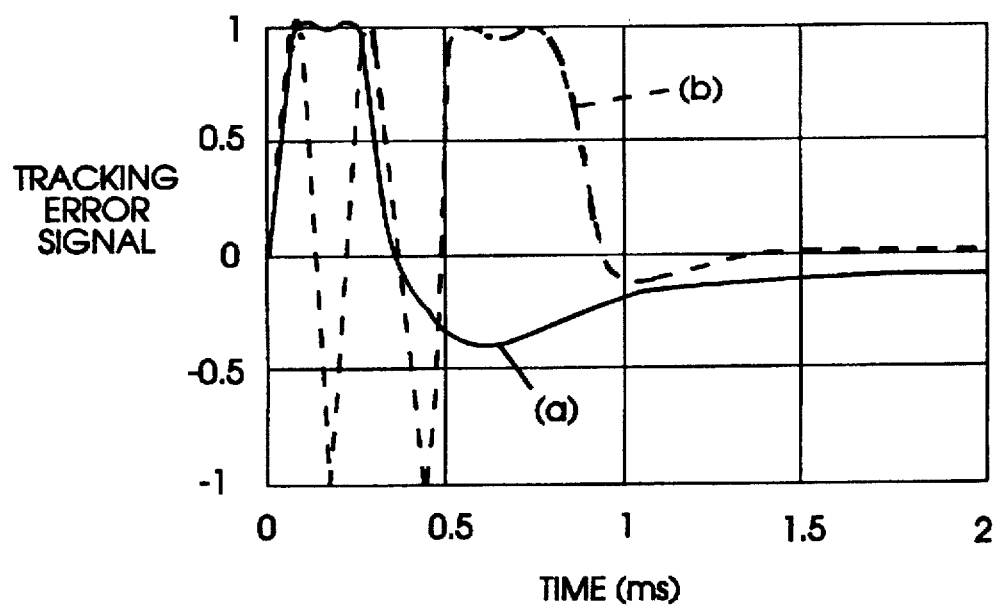
FIG. 5 is a graph showing the relationship between the tracking error signal and the head velocity of the disk storage unit according to the present invention.
Figure 7:
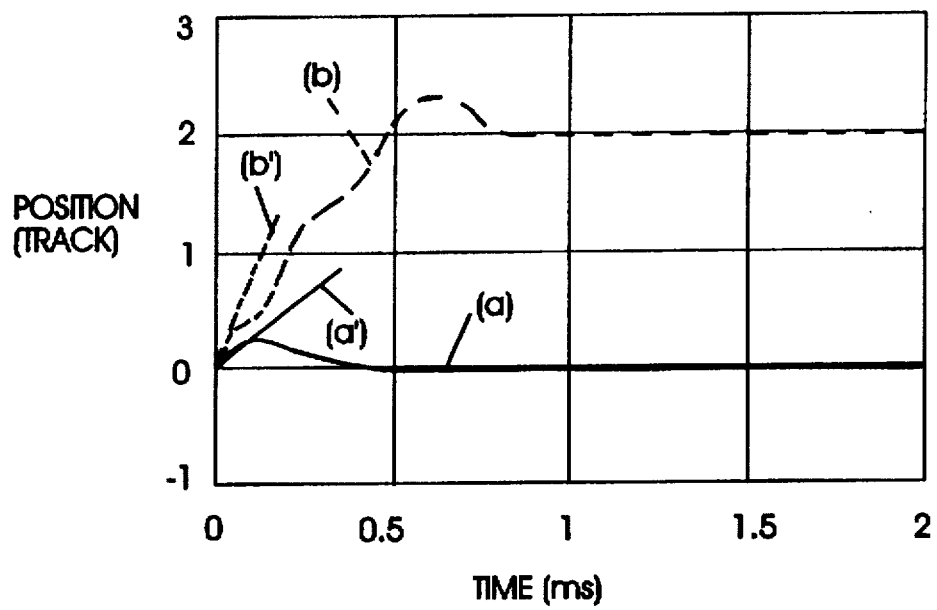
FIG. 7 is a graph showing how the head of the conventional disk storage unit converges on a target track at different velocities.
Figure 8:
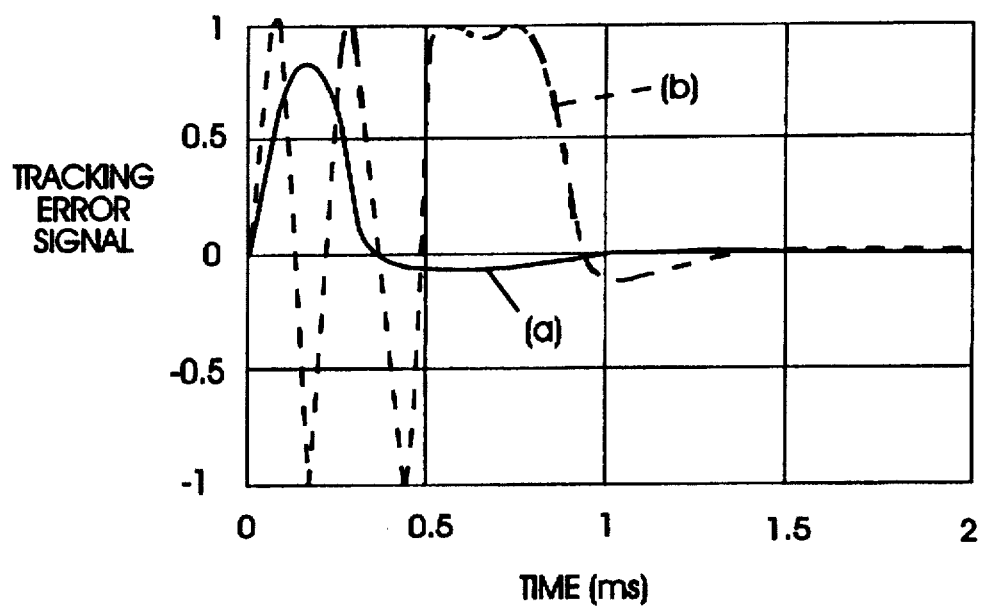
FIG. 8 is a graph showing the relationship between the tracking error signal and the head velocity of the conventional disk storage unit.
Figure 9:
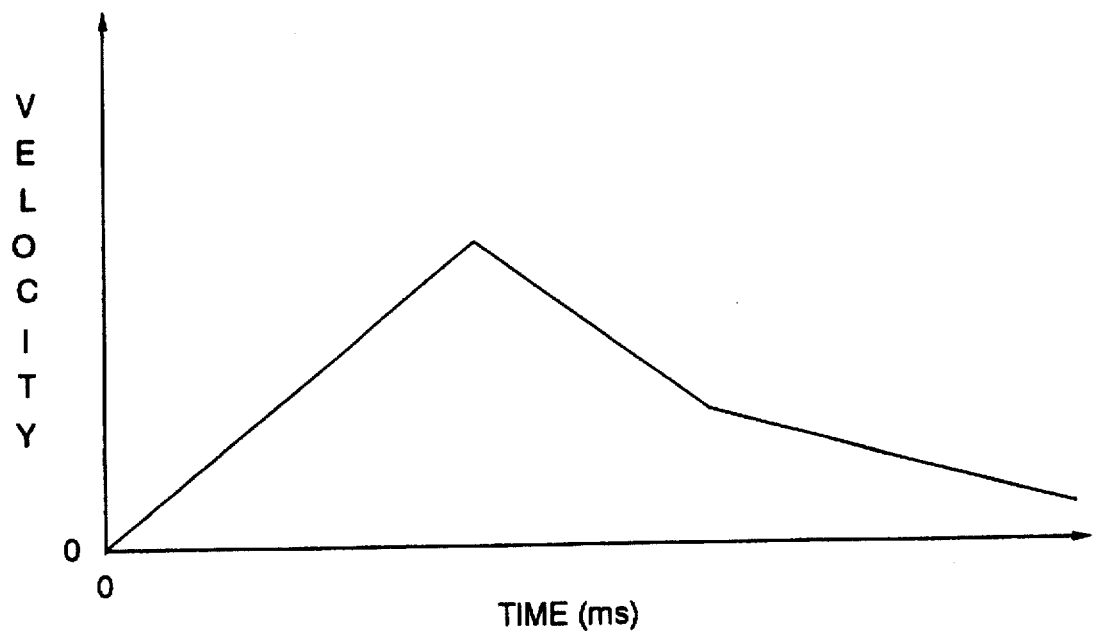
FIG. 9 is a graph showing how the head velocity of the conventional disk storage unit varies with time.

FIG. 4 is a graph corresponding to FIG. 7. Line c in this graph is where a suitable offset is applied under conditions similar to line b in FIG. 7, which is also shown in FIG. 4. It is seen that the head converges on the target track although the velocity is the same when the mode is switched to the tracking operation (tangential line). FIG. 5 is a graph corresponding to FIG. 8.

As described hereinbefore, seek time can be stably shortened in accordance with the present invention.

In addition, the allowable range of head velocity at which the head can be pulled to the target track can be expanded.

Further, a failure in pulling, which is caused by optic-axial offset of objective lenses in optical disks, and by nonuniformity in disk groove shapes and gain fluctuations in actuators and sensors in disk storage units, can be prevented.

Further, a tracking control, capable of stably pulling a head to a target track even if the head reaches the target track at high velocity, can be provided in accordance with the present invention.

While the invention has been particularly shown and described with reference to preferred embodiments thereof, it will be understood by those skilled in the art that various changes in form and details may be made therein without departing from the spirit and scope of the invention:

What is claimed is:

1. A disk storage unit, comprising:
   a head for at least reading data stored on tracks of a data storing disk;

a position sensor for detecting a position of said head relative to the tracks and for generating a tracking error signal, said tracking error signal having a tracking error signal offset;

a head drive connected to said position sensor for moving said head in a seek operation and a tracking operation based on the tracking error signal, said seek operation being for moving the head to a position for reading data on a target track from a position for reading data on a current track, said tracking operation being for controlling the head to follow said target track after the head reaches said position for reading data on the target track once;

a velocity detector connected to said position sensor for determining a velocity and a direction of movement of said head during a seek operation based upon said tracking error signal;

a dc offset generator connected to said velocity detector for generating a first dc offset corresponding to the velocity of said head during the seek operation;

a first charge storage device connected to said first dc offset generator for retaining said first dc offset during the seek operation, an output of said first charge storage device connected to said head drive during a tracking operation;

a first switch interposed between said dc offset generator and said first charge storage device, said first switch having a closed state during the seek operation and an open state during the track operation;

wherein said first dc offset is applied to said tracking error signal when the state of said first switch changes to said open state and an electrical charge of said first charge storage device is reduced over time, thereby reducing the velocity of said head;

a second charge storage device connected to said head position sensor for retaining a charge corresponding to said dc offset of said tracking error signal during the seek operation, an output of said second charge storage device connected to said head drive during a tracking operation; and a second switch interposed between said head position sensor and said second charge storage device, said second switch having a closed state during the seek operation and an open state during the track operation;

wherein said charge corresponding to said dc offset of said tracking error signal is applied to said tracking error signal when the state of said second switch changes to said open state and an electrical charge of said second charge storage device is reduced over time, thereby correcting said dc offset of said tracking error signal.

2. The disk storage unit as set forth in claim 1, wherein said velocity to which said first dc offset corresponds is a velocity of said head immediately before said seek operation is switched to said tracking operation.

* * * * *